(12) United States Patent
Cherrington

(10) Patent No.: US 6,276,550 B1
(45) Date of Patent: Aug. 21, 2001

(54) STORAGE CONTAINER AND STACK OF SUCH CONTAINERS

(76) Inventor: Kenneth Martin Cherrington, 53 Lickhill Road, Stourport-on-Severn, Worcestershire, DYB3 88L (GB)

( * ) Notice: Subject to any disclaimer, the term of this patent is extended or adjusted under 35 U.S.C. 154(b) by 0 days.

(21) Appl. No.: 09/405,573

(22) Filed: Sep. 27, 1999

(30) Foreign Application Priority Data

Oct. 3, 1998 (GB) .................................................. 9821497

(51) Int. Cl.$^7$ ............................. A47G 19/00; B65D 21/02
(52) U.S. Cl. .................... 220/23.4; 220/23.6; 220/23.86
(58) Field of Search ................................ 220/23.6, 23.4, 220/23.86

(56) References Cited

U.S. PATENT DOCUMENTS

| | | | | |
|---|---|---|---|---|
| 3,131,829 | * | 5/1964 | Masser ................................ | 220/23.4 |
| 3,194,426 | * | 7/1965 | Brown, Jr. ........................... | 220/23.4 |
| 3,338,452 | * | 8/1967 | Oakley et al. ...................... | 220/23.4 |
| 4,258,847 | * | 3/1981 | Nierman .............................. | 220/23.4 |
| 4,328,902 | * | 5/1982 | North ................................... | 220/23.4 |
| 4,428,479 | * | 1/1984 | Shirako et al. ..................... | 220/23.4 |
| 5,016,946 | * | 5/1991 | Reznikov et al. ................... | 312/108 |
| 5,050,755 | * | 9/1991 | Strawder ............................. | 220/23.4 |
| 5,310,071 | * | 5/1994 | Rivlin et al. ........................ | 220/23.4 |
| 5,316,159 | * | 5/1994 | Douglas et al. .................... | 220/23.4 |
| 5,503,288 | * | 4/1996 | Conconi ............................. | 220/23.4 |
| 5,845,790 | * | 12/1998 | Smith ................................. | 220/23.4 |

FOREIGN PATENT DOCUMENTS

WO96/33494 * 10/1996 (WO).

* cited by examiner

*Primary Examiner*—Joseph M. Moy
(74) *Attorney, Agent, or Firm*—Steven J. Hultquist; Marianne Fuierer

(57) ABSTRACT

This invention relates to a storage container and to a stack of such containers, and in particular to a container for the storage of a number of similarly-sized articles such as compact disks or the like. According to the invention there is provided a storage container for compact disks or the like having a first connector part and a second connector part, the connector parts being adapted to interconnect the storage container with at least one adjacent storage container so that the container is stackable. There is also provided a stack of storage containers in which the first connector part of one storage container is interconnected with the second connector part of an adjacent storage container, and in which all of the storage containers in the stack are identically formed.

13 Claims, 6 Drawing Sheets

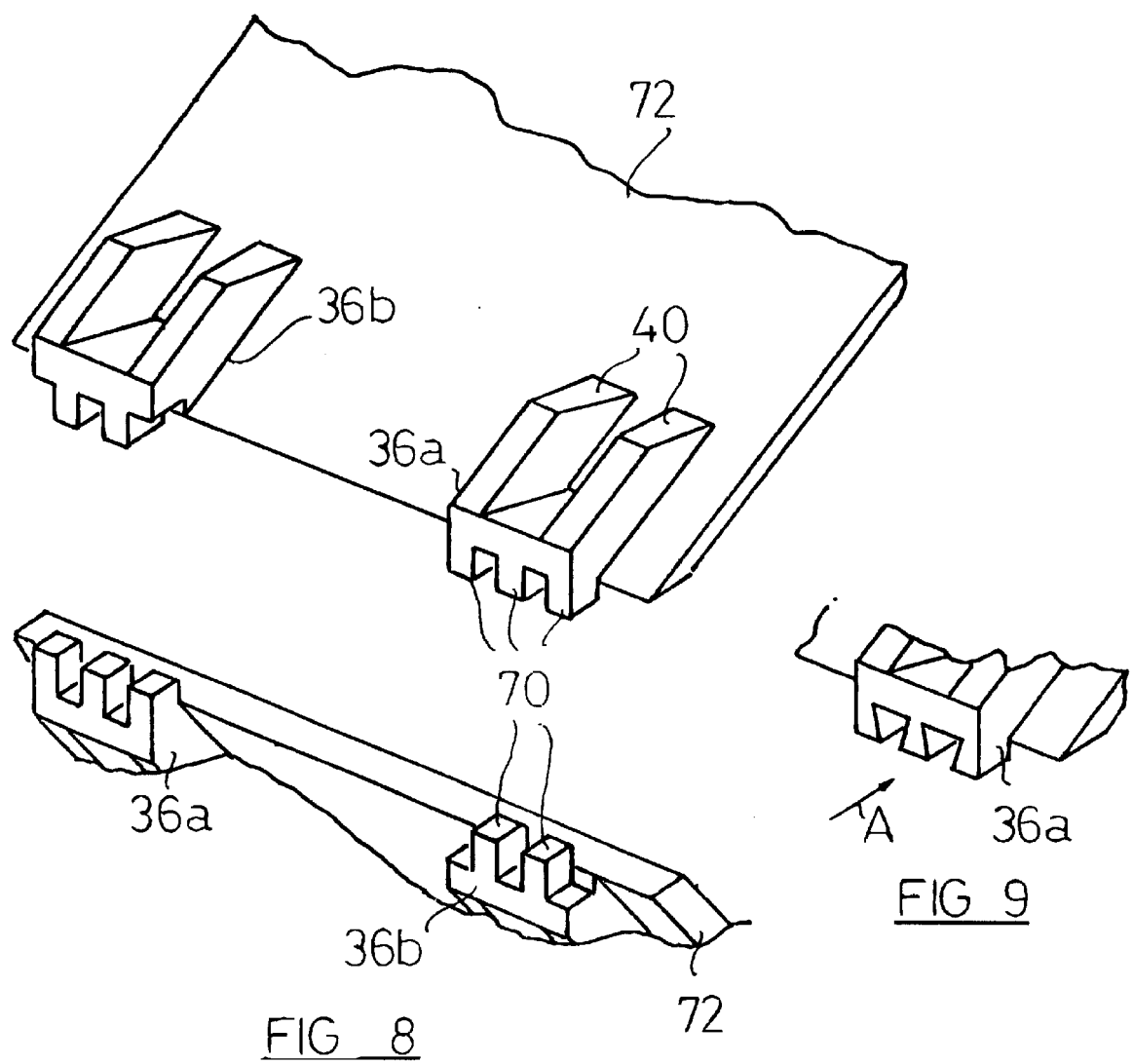

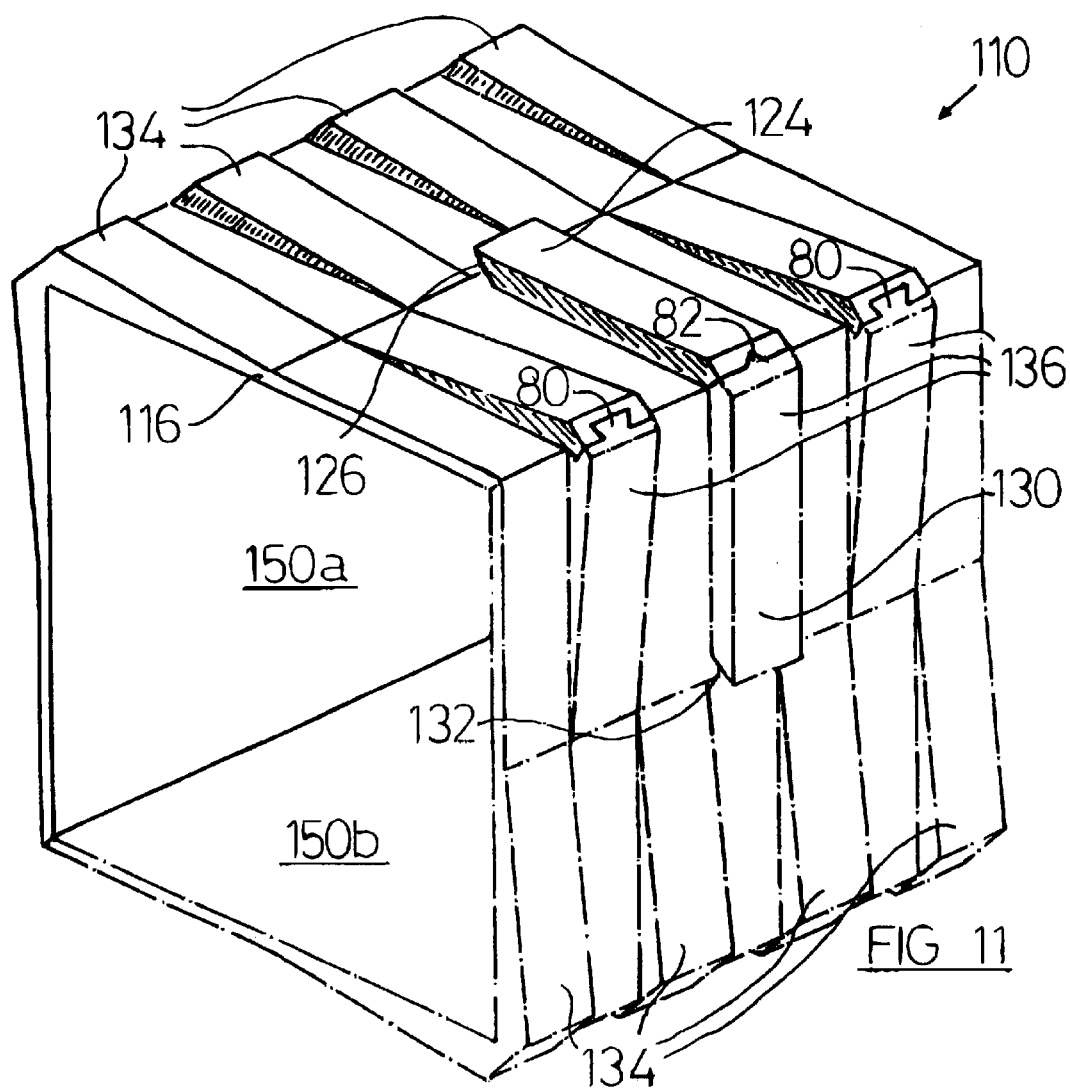
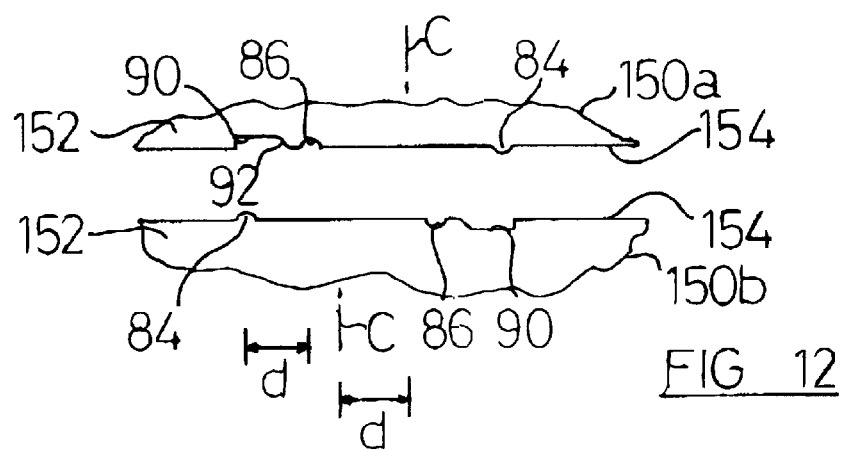

STORAGE CONTAINER AND STACK OF SUCH CONTAINERS

FIELD OF THE INVENTION

This invention relates to a storage container and to a stack of such containers, and in particular to a container for the storage of a number of similarly-sized articles such as compact disks or the like.

BACKGROUND OF THE INVENTION

Compact disks are manufactured to a standard size, and are usually located within a protective sleeve or case, the sleeve or case also being typically of a standard size.

The invention is expected to find its greatest utility in relation to compact disks since these are typically stored in large numbers. However, the storage of other articles is not precluded, such as video cassettes, music cassettes "mini-disks", computer disks and console games, for example. For simplicity the following description will refer predominantly to compact disks, but the following references to such disks or to "disks" or to "compact disks or the like" should be interpreted as meaning any suitable articles such as those listed above. It is also expected that the invention will find its greatest utility for the home storage of such articles, though institutional or commercial use of the container is not thereby excluded.

DESCRIPTION OF THE PRIOR ART

Containers are known for the storage of compact disks. Many of the available containers are of a specific capacity and once the user has a greater number of disks than the specified capacity a further container is required. Some available containers have flat exterior top and bottom surfaces so as to be stackable one on top of another, so that the size of the storage capacity can be increased incrementally.

In many of the container designs, the disks are maintained in a vertical orientation; such containers typically have panels, or spaced slots or recesses, which serve to partition the container so that each individual disk can be separately located. The partitions also prevent the disks from toppling over if the container is not full (disks which have toppled over may hinder the insertion of another disk into the container). However, the use of partitioning panels, slots or recesses reduces the number of disks which can be contained within a given volume, so that more space is required in which to store the disks, and perhaps a greater number of containers is required, than would otherwise be the case.

STATEMENT OF THE INVENTION

It is the object of the present invention to provide a storage container for compact disks and the like which is stackable in a number of different configurations, so that the configuration of the stack can be chosen by the user to suit his or her particular requirements and to suit the space available in which the storage container stack is to be located. In addition, the configuration can be changed as and when desired by the user. It is another object to provide a storage container which does not require partitioning panels, slots or recesses.

According to the invention, there is provided a storage container having a first connector part and a second connector part, the connector parts being adapted to interconnect the container with adjacent containers so that the container is stackable.

The provision of cooperating connector parts enables an assembled stack to be substantially rigid, i.e. the interconnection between adjacent containers is positive rather than relying solely upon friction to prevent relative movement between adjacent containers. Since relative movement between adjacent containers is limited by the connector parts, it is possible to build larger and more elaborate stacks, perhaps more suited to the space available in which the storage of articles such as compact disks is permitted.

Preferably, each container in an assembled stack has a first connector part and a second connector part, the first connector part of one container being adapted to interconnect with the second connector part of an adjacent container; preferably also all of the containers in the stack are identically formed.

Usefully, the connector parts project from the walls of the container; usefully also, spacing means are provided which project from the walls of the container by substantially the same distance as the connector parts. Preferably, the spacing means has formations adapted to cooperate with formations of the spacing means of an adjacent container to prevent relative lateral movement therebetween.

Desirably, the container is of substantially rectangular construction in front view, preferably a square construction, with a rear wall and four side walls (the front wall is omitted to provide an opening for insertion of the compact disks or the like).

Usefully, the container is arranged in use so that the side walls are angled to the horizontal, preferably by 45° or thereabouts. Accordingly, when compact disks or the like are located in the storage container they lie at 45° or thereabouts; there is no requirement for partitioning panels, slots or recesses since the disks cannot topple over, and the disks or the like self-stack, with any empty space remaining in the container always available for the insertion of additional disks.

Usefully, at least one triangular element provides support for the stack adjacent the floor or other surface upon which the stack rests; usefully the triangular element comprises half a container.

Preferably, an insert provides partitions within the container so that the container can be adapted to store articles of different sizes.

There is also provided a stack of storage containers as defined herein, in which the first connector part of one container is interconnected with the second connector part of an adjacent container, and wherein all of the containers in the stack are identically formed.

BRIEF DESCRIPTION OF THE DRAWINGS

The invention will now be described, by way of example, with reference to the accompanying drawings, in which:

FIG. 8 is a perspective view of an alternative design of spacing means of two cooperating "half" containers;

FIG. 9 is a perspective view of another alternative design of spacing means of one "half" container;

FIG. 11 shows a perspective view of an alternative embodiment of storage container; and FIG. 12 is a view of part of each half of the container of FIG. 11, during the assembly thereof.

DETAILED DESCRIPTION OF THE PREFERRED EMBODIMENTS

Figure 1:
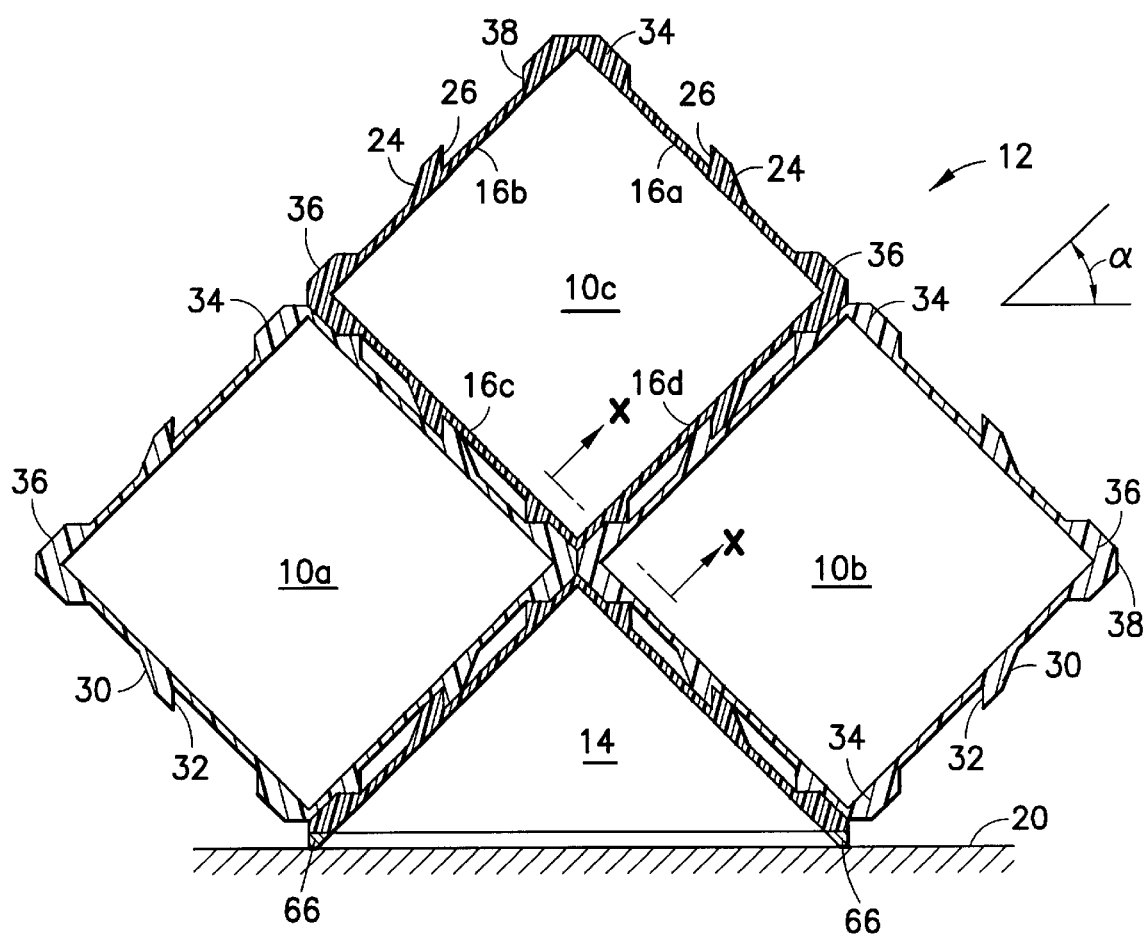
FIG. 1 is a front view of a stack formed from three storage containers according to the invention, and one triangular element.

FIG. 1 shows three identical containers 10a, 10b and 10c interconnected into a stack 12. FIG. 1 is not a sectional view, but the sides of the three containers 10a,b,c have been cross-hatched to clarify the cooperation between their respective connecting parts and spacing means.

In addition, the stack 12 includes an optional triangular element 14, which as described below comprises half a container 10; the sides of the triangular element 14 are also cross-hatched, for clarity. As indicated, the triangular element 14 is optional, i.e. the stack of three containers 10a,b and c would be stable and substantially rigid without the triangular element 14. However, the element 14 adds further rigidity, and makes assembly of the stack 12 easier.

It will be noted that each container 10a,b,c is square in front view, and the four sides 16a, 16b, 16c and 16d of each container are arranged at an angle α, in this embodiment 45°, to the surface 20 upon which the stack 12 rests.

When compact disks or the like are located in one of the containers 10, they will lie upon one or other of the sides 16c, or 16d. Assuming that they lie upon side 16c, the storage container 10 can be progressively filled up until a disk lies adjacent side 16a. Thus, it is a feature of the angled orientation of the disks that the disks will be self-stacking, and a non-full container will present an opening available for the insertion of further disks without need for partitioning panels, slots or recesses, i.e. the stored disks cannot topple over and obscure or otherwise obstruct the opening into which further disks could be inserted. In this way, the volume of the storage container which is available for disk storage is maximised.

The sides 16a and 16b each carry a projecting first connector 24, which comprises a lug with a locking wall 26 which is substantially vertical in use, i.e. substantially perpendicular to the surface 20, and at 45° to the sides 16a,b.

The sides 16c and 16d each carry a projecting second connector 30, which comprises a lug with a locking wall 32 which is also substantially vertical in use, i.e. substantially perpendicular to the surface 20 and at 45° to the sides 16c,d.

It will be understood from FIG. 1 that the first and second connectors 24,30 can be identically formed, and differ only in that the first connectors 24 project upwardly in use, whilst the second connectors 30 project downwardly in use. However, since in the preferred embodiments as in FIG. 1, the orientation of the containers 10 can be inverted without material effect, the form of the first and second connectors 24,30 is identical.

It is arranged that when two containers 10 are placed together so that a side 16c or 16d of a second container lies against a side 16a or 16b of a first container respectively, the wall 32 of the second connector 30 of the second container will engage the wall 26 of the first connector 24 of the first container. The aligned (vertical) orientation of the engaging walls 26,32 will counter the tendency of the second container to rotate or slide relative to the first container.

In embodiments such as that of FIG. 1 wherein there are two "first" containers 10a, 10b to which the second container 10c is connected, a rigid construction can be created, and can be developed by adding further containers to the sides 16a and/or 16b of the containers 10a,b and/or c (as applicable), as desired.

Whilst not mandatory, in the embodiments shown the first and second connectors 24,30 are arranged at the centre of their respective sides (in both the "front to back" and "top to bottom" directions in the orientation of FIG. 1), which adds to the universality of the design and enables containers to be interchanged and inverted without material effect.

The containers 10a,b,c also have spacing means 34,36 located at each corner, which spacing means project from the respective sides by a distance substantially the same as the projection of the first and second connectors 24,30. The purpose of the spacing means 34,36 will be readily apparent from FIG. 1, namely to prevent or reduce the likelihood that adjacent containers will rock or pivot about their cooperating connectors in use. The provision of the spacing means 34,36 therefore adds to the rigidity of a stack of containers in use.

Figure 2:
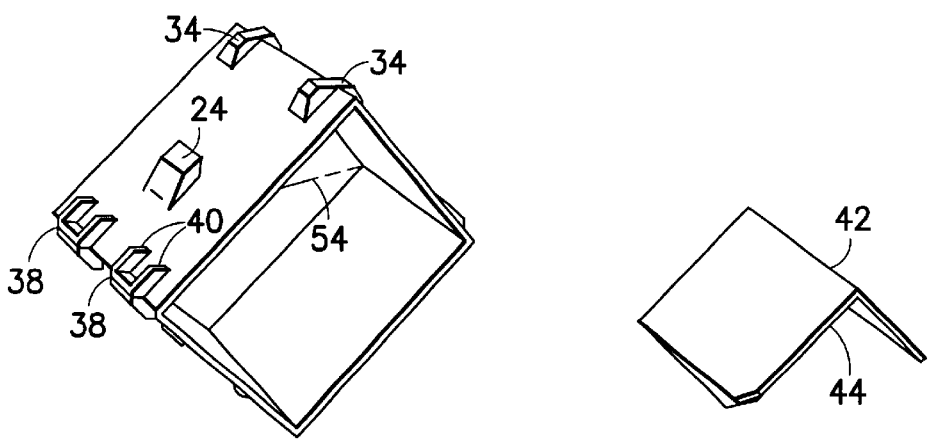
FIG. 2 is a perspective view of a storage container according to the invention.

The spacing means is in two cooperating parts, a male part 34 and a female part 36. The provision of male 34 and female 36 cooperating parts enables the spacing means to provide the ancillary function of preventing lateral movement of one container relative to its adjacent container (i.e. into and out of the paper in the orientation of FIG. 1). Thus, as seen in FIG. 2, a portion of the male spacer 34 can locate between the bifurcated arms 40 of the female spacer 36, so preventing lateral movement therebetween.

In the stack 12 of FIG. 1, the spacers are arranged so that a male spacer 34 is present at the apex and base of each container 10, whilst a female spacer 36 is present at each of the side extremities thereof. In this way, a male spacer will always encounter and cooperate with a female spacer, as the stack of containers is built up. Clearly, it would also be possible for the positions of the male and female spacers to be reversed, provided that the reversal was carried out for every container.

When it is desired to construct the stack 12 of FIG. 1, the triangular element 14 is placed upon the surface 20 and the containers 10a,b are connected thereto by movement in the substantially vertical direction so that the wall 32 of the connector part 30 of the container 10a,b locates behind the wall 26 of the connector part 24 of the triangular element 14, and the male and female spacers of the container 10a,b, respectively and the triangular element cooperate. The container 10c is then connected to the containers 10a and 10b by movement in the substantially vertical direction so that the walls 32 of the connector parts 30 of the container 10c locate behind the respective walls 26 of the connector parts 24 of the containers 10a,b, and the male and female spacers of the container 10c and the containers 10a,b respectively, cooperate.

If it is desired to build a more extensive or elaborate stack, further containers can be added as above, i.e. by substantial vertical movement into engagement with an existing stack container.

It will be understood that the reference to substantially vertical movement in the stack assembly routine described above arises because the walls 26,32 lie substantially vertical in use. If the stack is oriented differently, or the walls 26,32 are not at 45° to the sides of their container, then the stack assembly instructions would be altered accordingly. It will also be noted that the edges 38 of the male spacer 34 are substantially parallel to the walls 26, i.e. arranged at 45° to the sides of the container; so as to ensure that the male and female spacers can interengage when assembled as above described.

Figure 3:
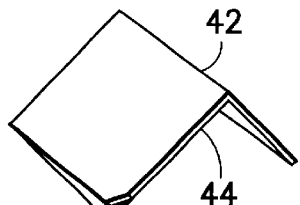
FIG. 3 is a perspective view of an insert for use with the container of FIG. 2.

The containers 10 have internal dimensions of 135 mm by 135 mm, and are thus sized to receive standard compact disk cases. If it is desired to store differently-sized articles, such as blank or pre-recorded mini-disks, then an insert 42 can be provided (FIG. 3). The insert 42 rests inside the container, and presents an interior volume 44 and an exterior volume (between the walls of the insert and the walls of the container); the walls of the insert can be of dimensions to enable the interior volume and the exterior volume to store articles of certain dimensions, perhaps different articles in a single container. If desired, however, different sized containers can be provided, suited to articles of a specific size.

Figure 4:
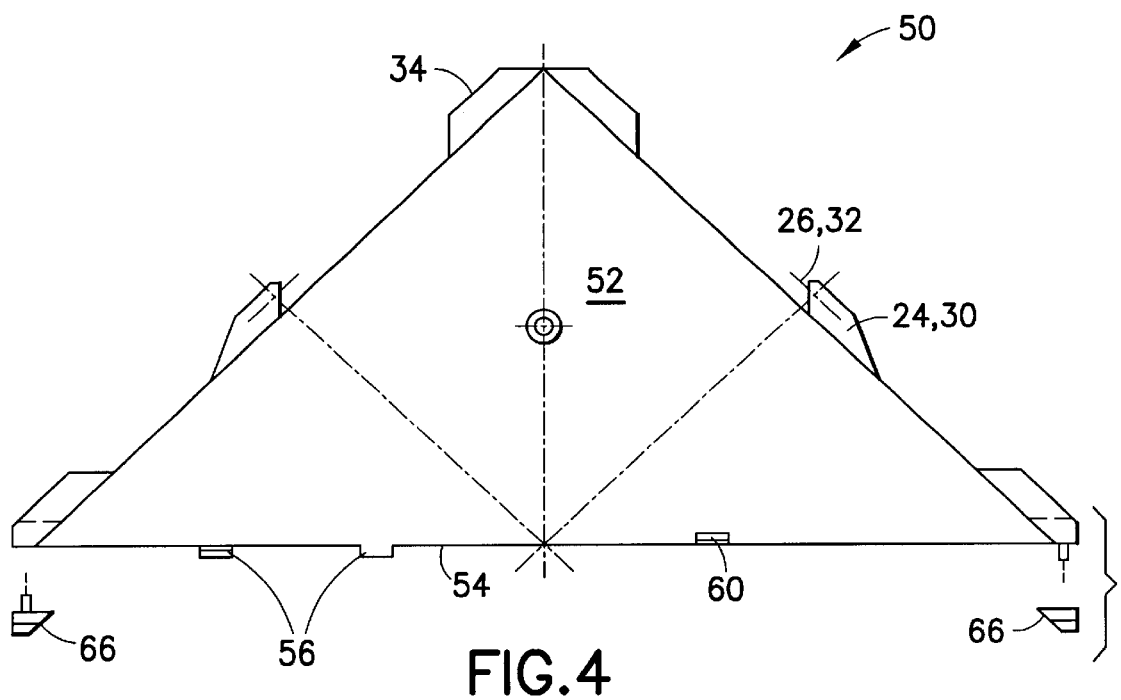
FIG. 4 is a front view of the triangular element of FIG. 1.
Figure 5:
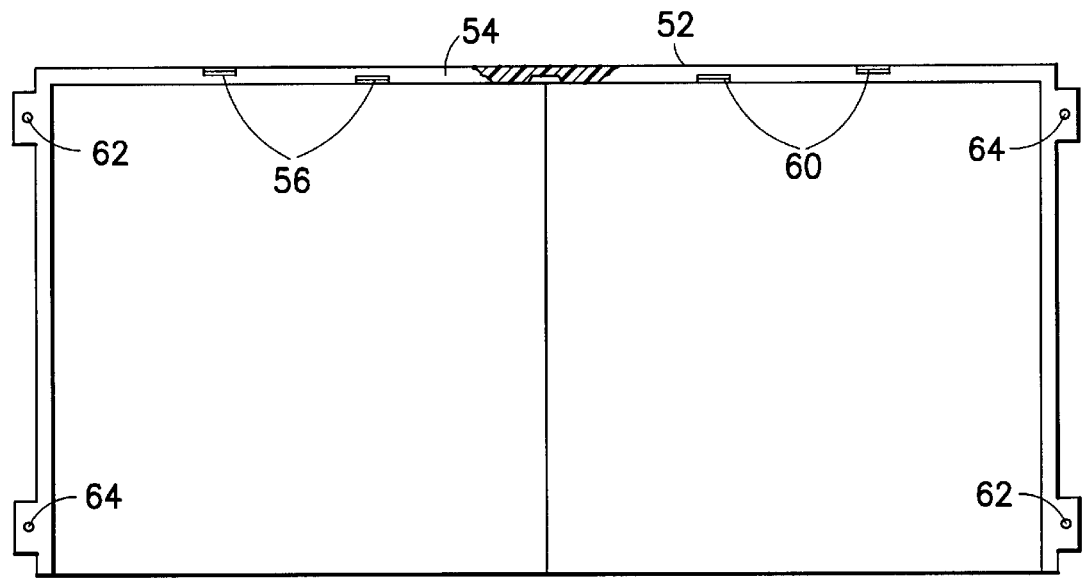
FIG. 5 is an underneath view of the triangular element.
Figure 6:
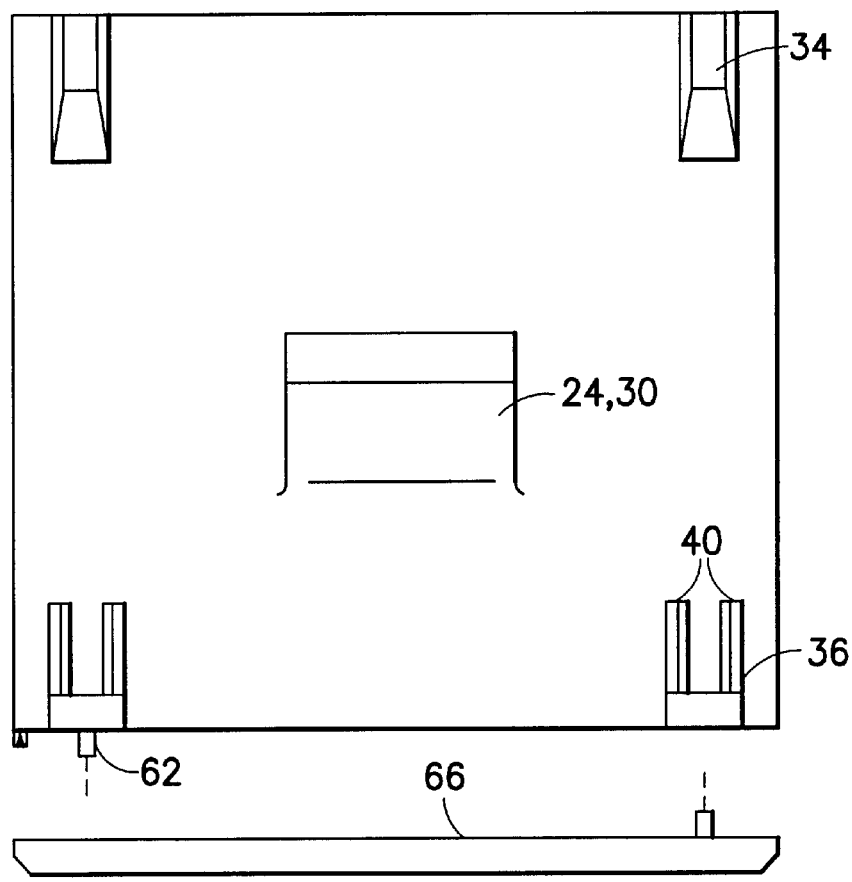
FIG. 6 is a side view of the triangular element.
Figure 7:
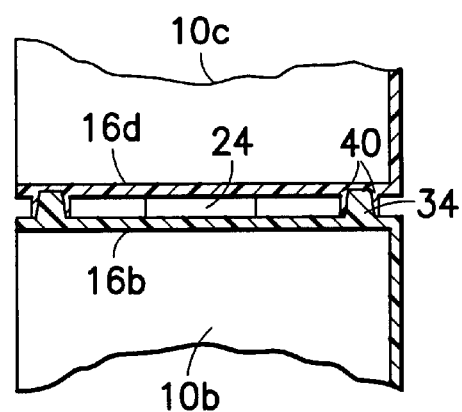
FIG. 7 is a sectional view along the line X—X of FIG. 1.
Figure 10:
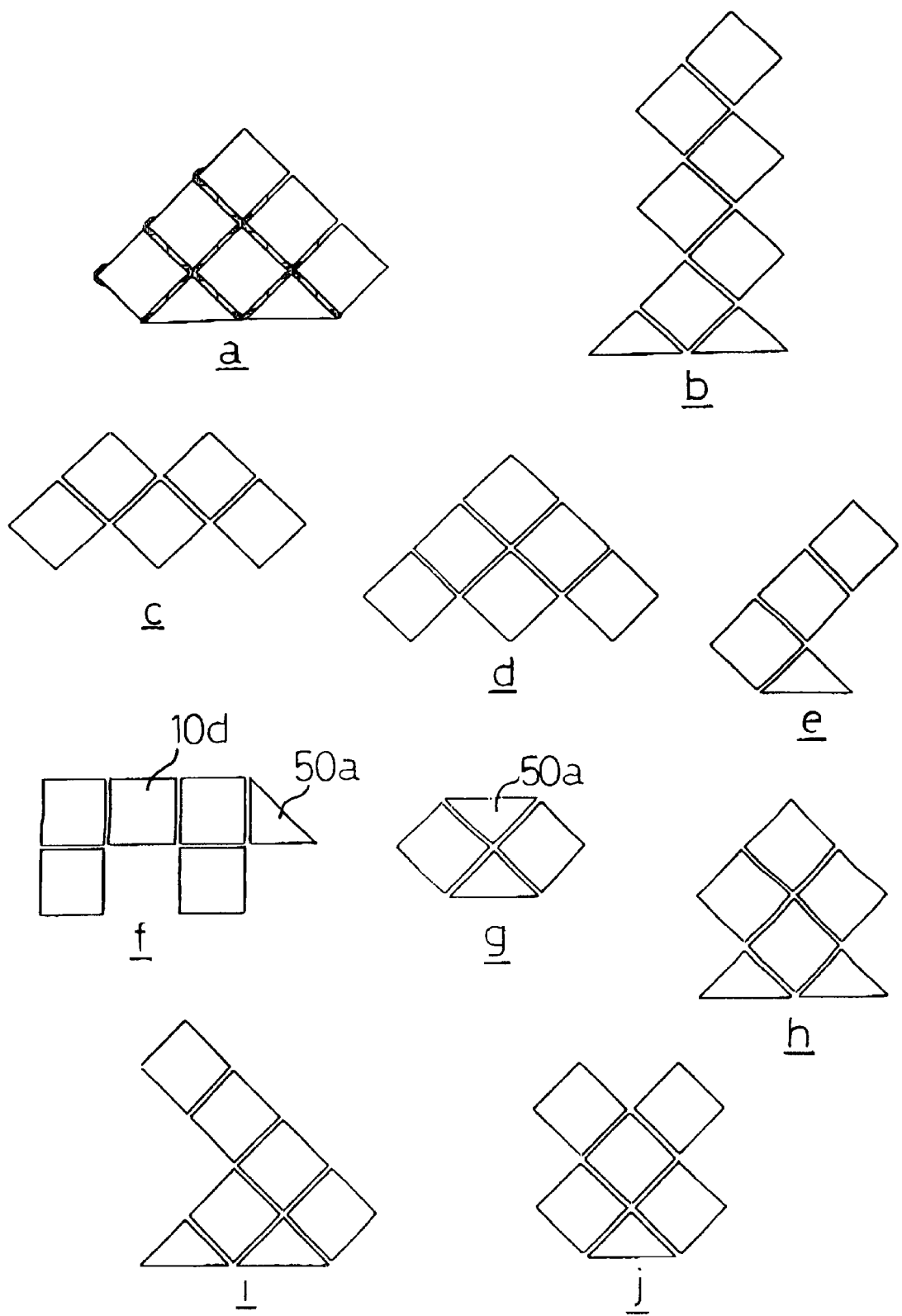
FIGS 10a–j show several different stacking options.

FIGS. 4 and 5 show the triangular element 14 which is used as a base or stabilising support for the stack 12 of FIG. 1. However, it is an additional feature of the design that the triangular element 14 is made up of a half of a container 10. Thus, in the preferred embodiments, each container 10 is manufactured from two identical (triangular) halves 50. The ability to manufacture each half 50 identical will reduce the tooling cost required.

It is desired that the containers 10 be of a suitable plastics material.

Each container half 50 has two first or second connectors 24,30 respectively; since the connectors are identical, whether they are first connectors or second connectors will only be determined in use (i.e. whether they face upwardly or downwardly). Each half 50 also has one set of male spacers 34, and a portion of two sets of female spacers 36. When the half 50 is connected to an identical half (which has been rotated through 18020 ) to provide a complete container 10, the two portions of the female spacers will lie together to provide the complete female spacer.

Each half 50 has two sides 16a and 16b (or 16c,d), and a rear wall 52. The rear wall 52 is triangular, and has an edge 54 which engages a corresponding edge of the other half when assembled into a container 10. The edge 54 carries two projections 56 and has two corresponding recesses 60, the projections 56 locating into respective recesses 60 when the two halves 50 are assembled together. In addition, as better seen in FIG. 5, the female spacer parts have a cooperating peg 62 and recess 64, the peg 62 locating into a recess 64 when the two halves 50 are assembled together. It is preferably arranged that the projections 56 and pegs 62 are a tight fit into the respective recesses 60,64 so that the two halves can be snapped (and remain) together; alternatively or additionally adhesive can be used to retain the two halves 50 together as an assembled container 10.

When it is intended that a half 50 be used on its own, i.e. as the triangular element 14 in the stack of FIG. 1, then it is necessary to fit rods 66, which include a peg and recess corresponding to the peg 62 and recess 64, and serve as a stand upon which the half 50 can rest without the pegs 62, or projections 56, engaging the surface 20.

In the embodiment of FIGS. 8 and 9, the need for a separate rod upon which to stand the half is avoided, which will again save on the tooling cost required. In this embodiment, the two portions 36a,b of the female spacer have cooperating castellations 70, by which the two halves 72 can be connected together. However, the castellations 70 also serve as a stand upon which the half or triangular element 72 can rest. Each half 72 has one female spacer portion 36a and one portion 36b, so that each half of a container can be identically formed.

In the alternative embodiment of FIG. 9 the castellations of the female spacer portions (only one of which is shown) are dovetailed, and are designed to be slid together substantially along the line A, the dovetailing preventing separation of the castellations perpendicular to the direction A. In this embodiment therefore, the dovetailing ensures that the two halves of a container will not become inadvertently separated, as may tend to occur if a very large or unbalanced stack is erected. In a further alternative embodiment, the dovetailed castellations are sufficiently deformable to permit snapping together perpendicular to the direction A, but act to retain the two container halves together once assembled.

FIG. 10a–j show several alternative forms of stack, and it is pointed out that these alternatives are by no means exhaustive. It is also to be noted that not all of the stacks have the containers at an angle of 45°, and in some cases (FIGS. 10f) the sides of the containers can be substantially parallel and perpendicular respectively to the surface upon which the stack rests. Such constructions may be sufficiently stable without external support, though it is expected that stacks in the form of "bridges" or the like (such as that of FIG. 10f, in which the container 10d is only supported at its sides and not from underneath) would desirably require fixing to an adjacent structure such as a wall for example (screw holes can be provided in the container rear wall for this purpose). Also, it is expected that larger stacks would require certain of the containers to be fixed to an adjacent structure by way of a precaution.

It is also noted that in certain embodiments (FIG. 10f and FIG. 10g) a triangular element or container half 50a is used other than as a support, i.e. it may be added part way up the stack for additional storage.

FIG. 11 shows a perspective view of a storage container 110, made up of two identical halves or triangular elements 150a,150b. One of the triangular elements 150a is shown in solid lines, the other 150b is shown in dashed lines.

This embodiment has a first connector part 124, with its locking wall 126, and a second connector part 130 with its locking wall 132, the locking walls 126,132 being substantially identically formed, and identically positioned, as the locking walls 26,30 of the storage container 10.

In this embodiment, however, the spacing means 134,136 are elongated, and taper towards the wall 116, so as to be more aesthetically pleasing as well as functional. It will be noted that there are four spacing ribs 134, and three spacing ribs 136, the ribs being sized and positioned so that each of the three ribs 136 can lie between two adjacent ribs 134 of an adjacent storage container 110. In this way, the ribs prevent lateral movement between adjacent storage containers, as do the spacing means of the other embodiments described.

Two of the spacing ribs 136 of each element 150a,b carry a dovetail 80 which can locate in a correspondingly shaped recess in the other element; the third spacing rib (in this embodiment the central spacing rib) carries a bead 82 which can locate in a correspondingly shaped recess in the other element. It will readily be understood that the dovetails 80 and the corresponding recesses cooperate to maintain the elements 150a,b together, as in the embodiment of FIG. 9.

The bead 82 is provided to assist with assembly of the two triangular elements 150a,b together, as will be described below.

Part of each triangular element 150a,b is shown in FIG. 12, specifically, a part of each rear wall 152 and a part of each edge 154 of the triangular elements 150a,b. As shown, each edge 154 carries a projection 84 which can locate into a correspondingly shaped recess 86. Each edge 154 also has an elongated recess 90 which can accommodate the projection 84. When it is desired to assemble the two triangular elements 150a,b together, they are aligned as shown with their respective centre lines C offset by a distance d, in which position the projection 84 of one element is aligned with the elongated recess 90 (specifically with the end of the elongated recess 90 remote from the recess 86). When the elements are brought together in this position so that the respective edges 154 engage, the projections 84 will enter the respective elongated recess 90. In this position, the neither the dovetails 80 nor the beads 82 are involved, since the distance d by which the centre lines C (and thus the side walls of each element 152) are separated exceeds the thickness of the side walls.

To assemble the storage container from this position, the elements 150a,b are slid relative to one another to align the centre lines C. The first thing to occur is that the beads 82 enter their respective recesses, serving to align and guide the elements 150a,b together, i.e. to keep the rear walls 152 aligned in the plane of the paper as viewed in FIG. 12. This alignment also ensures that the dovetails 80 can enter their respective recesses. It is expected that this alignment will be further ensured in practice by assembling the two elements on a table or other substantially flat surface, with the rear walls 152 lying upon that surface.

Subsequently, the dovetails 80 enter their respective recesses, and the secure connection between the two elements 150a,b has been commenced. Shortly thereafter, the projections 84 engage respective ramps 92 of the elongated recesses, and ride up the ramps 92, forcing the edges 154 slightly apart locally (the elements 150a,b are maintained together by the dovetails 80, but are sufficiently resilient to tolerate local separation along part of the edges 154—in any event the projections 84 are small, perhaps approximately 0.5 mm, so that the local separation is also small).

Relative movement between the elements 150a,b is continued, the projections 84 sliding along the short length of the respective edge 154 separating the elongated recess 90 from the recess 86.

When the projections 84 enter the respective cooperating recesses 86 the assembly is complete, the centre lines C being aligned and the storage container being in the assembled condition of FIG. 11.

It is noted that the distance d by which the projection 84 must move from the remote end of elongated recess 90 to the recess 86 is the same distance d by which the center lines are initially separated as shown in FIG. 12.

In other embodiments the beads 82 may be omitted, i.e. it might not be necessary to provide any guides for assembly of the dovetails 80. In addition, in such embodiments the central rib 134 may also carry a dovetail 80 and its cooperating recess, if desired.

What is claimed is:

1. A storage container having a size sufficient for storage of compact disks, the storage container being of square construction with four side walls, the storage container having two first connector parts and two second connector parts, a respective connector part projecting from each of the side walls, each connector part being adapted to interconnect the storage container with an adjacent storage container so that the storage container is stackable, the storage container having spacing means projecting from each side wall, the spacing means being separate from the connector parts.

2. A storage container according to claim 1 wherein the spacing means projects by substantially the same distance as the connector parts.

3. A storage container according to claim 2 wherein the connector parts are located adjacent the center of said respective side walls, and in that the spacing means are located adjacent the intersection of two side walls.

4. A storage container according to claim 2 having a first form of spacing means and a second form of spacing means, the first form of spacing means having a part adapted to cooperate with a part of the second form of spacing means of an adjacent storage container to restrict the relative lateral movement therebetween.

5. A storage container according to claim 1 wherein the container also has a rear wall connected to the side walls.

6. A storage container according to claim 1 formed of two identical halves, each half comprising a triangular element.

7. A storage container according to claim 6 wherein the two triangular elements have cooperating parts adapted to retain the elements together.

8. A stack of storage containers according to claim 1 wherein the first connector part of one storage container is interconnected with the second connector part of an adjacent storage container, and in that all of the storage containers in the stack are identically formed.

9. A stack according to claim 8 wherein the side walls of each container are angled to the horizontal, preferably by 45° or thereabouts.

10. A triangular storage element having two similarly-sized side walls arranged at right angles to each other, both of the side walls having a first or a second connector part projecting therefrom, and both of the side walls having a spacing means projecting therefrom, the spacing means being separate from the connector parts, the storage element having connecting means adapted to interconnect the storage element with another substantially identical storage element whereby to provide a storage container of square construction with four side walls, the storage container having two first connector parts and two second connector parts, each connector part being adapted to interconnect the storage container with an adjacent storage container so that the storage container is stackable.

11. A triangular storage element according to claim 10 wherein at least a part of the connection means is carried by the spacing means.

12. A triangular storage element according to claim 11 having a rear wall connected to the side walls, wherein a part of the connection means is carried by the rear wall.

13. A storage container having a size selected to permit storage of compact disks or cassette tapes, the storage container being of square construction with four side walls, the storage container having two first connector parts and two second connector parts, a respective connector part projecting from each of the side walls, each connector part being adapted to interconnect the storage container with an adjacent storage container so that the storage container is stackable, the storage container having spacing means projecting from each side wall, the spacing means being separate from the connector parts.

* * * * *

UNITED STATES PATENT AND TRADEMARK OFFICE
CERTIFICATE OF CORRECTION

PATENT NO. : 6,276,550 B1  Page 1 of 1
DATED : August 21, 2001
INVENTOR(S) : Cherrington It is certified that error appears in the above-identified patent and that said Letters Patent is hereby corrected as shown below:

Column 5,
Line 30, change "18020" to -- 180º --

Column 6,
Line 10, change "FIG." to -- FIGS. --
Line 14, change "FIGS." to -- FIG. --

Signed and Sealed this

First Day of April, 2003

JAMES E. ROGAN
*Director of the United States Patent and Trademark Office*